(12) United States Patent
Totani et al.

(10) Patent No.: US 7,207,679 B2
(45) Date of Patent: Apr. 24, 2007

(54) PROJECTION TYPE VIDEO DISPLAY

(75) Inventors: Takahiro Totani, Osaka (JP); Katsumi Terada, Kyoto (JP); Hiroki Koba, Osaka (JP); Kazunobu Oketani, Kyoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/878,356

(22) Filed: Jun. 29, 2004

(65) Prior Publication Data

US 2004/0263801 A1 Dec. 30, 2004

(30) Foreign Application Priority Data

Jun. 30, 2003 (JP) .............................. 2003-187650

(51) Int. Cl.
- G03B 21/14 (2006.01)
- G03B 21/20 (2006.01)
- F21V 17/02 (2006.01)
- G02F 1/1335 (2006.01)
- H04N 9/31 (2006.01)

(52) U.S. Cl. .......................... 353/97; 353/85; 353/88; 362/321; 362/324; 359/578; 349/7; 348/744

(58) Field of Classification Search .................. 353/88, 353/20, 31, 37, 38, 84, 97–99, 102, 85, 86, 353/89; 349/5, 7, 25; 359/5, 6, 20, 25, 200, 359/578, 594; 345/63, 101, 690; 362/268, 362/282, 322, 321, 324; 348/739, 744
See application file for complete search history.

(56) References Cited

U.S. PATENT DOCUMENTS

| 5,649,753 | A | * | 7/1997 | Masumoto ................... 353/102 |
| 6,947,025 | B2 | | 9/2005 | Iisaka et al. |
| 2002/0105621 | A1 | * | 8/2002 | Kurematsu .................... 353/30 |
| 2003/0086265 | A1 | * | 5/2003 | Ilsaka et al. ................. 362/268 |
| 2003/0146919 | A1 | * | 8/2003 | Kawashima et al. ......... 345/609 |
| 2005/0270268 | A1 | | 12/2005 | Iisaka et al. |

FOREIGN PATENT DOCUMENTS

| JP | 03-179886 | 8/1991 |
| JP | 05-188345 | 7/1993 |
| JP | 05-303085 | 11/1993 |
| JP | 07-084553 | 3/1995 |
| JP | 08-106090 | 4/1996 |
| JP | 08-201812 | 8/1996 |
| JP | 09-116840 | 5/1997 |
| JP | 11-281923 | 10/1999 |
| JP | 2001-228569 | 8/2001 |
| JP | 2002-090705 | 3/2002 |
| JP | 2002-300498 | 10/2002 |
| JP | 2002-357810 | 12/2002 |
| JP | 2002-365607 | 12/2002 |
| JP | 2003-036063 | 2/2003 |
| JP | 2003-149730 | 5/2003 |
| WO | WO 02/089106 A1 * | 11/2002 |
| WO | 03/032080 A1 | 4/2003 |

OTHER PUBLICATIONS

Japanese Office Action dated May 23, 2006.
Japanese Office Action dated Sep. 19, 2006 (413619).
Japanese Office Action dated Jan. 16, 2007, (600526).

* cited by examiner

Primary Examiner—W. B. Perkey
Assistant Examiner—Rochelle Blackman
(74) Attorney, Agent, or Firm—Westerman, Hattori, Daniels & Adrian, LLP.

(57) ABSTRACT

A video signal processing circuit inputs a video signal to perform processing such as frequency conversion as well as processing for generating data representing the APL (Average Picture Level) of a frame video for each frame period. A microcomputer functions as a dimmer arithmetic block to perform processing for generating dimmer data upon receipt of APL data, and functions as a lamp driver control block to perform processing for sending out a dimmer command to a lamp driver. The lamp driver receives the dimmer command, to control an amount of light emitted from a light source (a lamp).

8 Claims, 5 Drawing Sheets

EXAMPLE OF DIMMER DATA CONVERSION LOOK-UP TABLE

PROJECTION TYPE VIDEO DISPLAY

BACKGROUND OF THE INVENTION

1. Field of the Invention

The present invention relates to a projection type video display such as a liquid crystal projector.

2. Description of the Background Art

Conventionally, a liquid crystal display so adapted that display luminance and contrast are made constant even when the APL (Average Picture Level) of a video is changed (see JP-A-08-201812), or a projection type video display for reducing lamp driving power when the APL of a video is high, while increasing lamp driving power when it is low, to improve contrast (see JP-A-03-179886) has been proposed.

SUMMARY OF THE INVENTION

However, it is desired to further improve contrast and reduce power consumption. Further, in a liquid crystal projector, black floating (incomplete reproduction of black color) which is its weakness must be restrained.

In view of the foregoing circumstances, an object of the present invention is to provide a projection type video display capable of achieving improvement in contrast, reduction in power consumption, and restraint of black floating in a case where a liquid crystal projector is used as a projection type video display.

In order to solve the above-mentioned problem, in a projection type video display that optically modulates light emitted from a light source by a light valve and projects a video, a projection type video display according to the present invention is characterized by comprising means for generating a signal representing the APL of a video on the basis of a video signal; and control means for carrying out such control as to increase an amount of light emitted from the light source when the signal represents a high level, while reducing an amount of light emitted from the light source when it represents a low level.

In the above-mentioned configuration, a video to be projected is brightened by increasing the amount of emitted light when a bright video is projected, while being darkened by reducing the amount of emitted light when a dark video is projected, thereby improving contrast. Further, power consumption is also reduced by reducing the amount of emitted light, thereby improving an energy saving effect. When a liquid crystal light valve is used as a light valve, black floating is restrained.

The control means may control power supplied to the light source.

In a projection type video display that optically modulates light emitted from a light source by a light valve and projects a video, a projection type video display according to the present invention is characterized by comprising a diaphragm for stopping down projected video light; means for generating a signal representing the APL of a video on the basis of a video signal; and control means for carrying out such control as to open the diaphragm when the signal represents a high level, while closing the diaphragm when it represents a low level.

In a projection type video display that optically modulates light emitted from a light source by a light valve and projects a video, a projection type video display according to the present invention is characterized by comprising a shading adjustment unit for adjusting shading of illuminating light from a light source; means for generating a signal representing the APL of a video on the basis of a video signal; and control means for carrying out such control as to reduce an amount of shading by the shading adjustment unit when the signal represents a high level, while increasing the amount of shading by the shading adjustment unit when it represents a low level.

In the projection type video displays having these configurations, the amount of emitted light is not reduced, the energy saving effect is not obtained. However, it is possible to achieve improvement in contrast and restraint of black floating in a case where a liquid crystal light valve is used.

Means for generating the signal representing the APL of the video on the basis of the video signal may produce an average value of APLs in a plurality of continuous frames.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A liquid crystal projector according to an embodiment of the present invention will be described on the basis of FIGS. 1 to 5.

Figure 1:
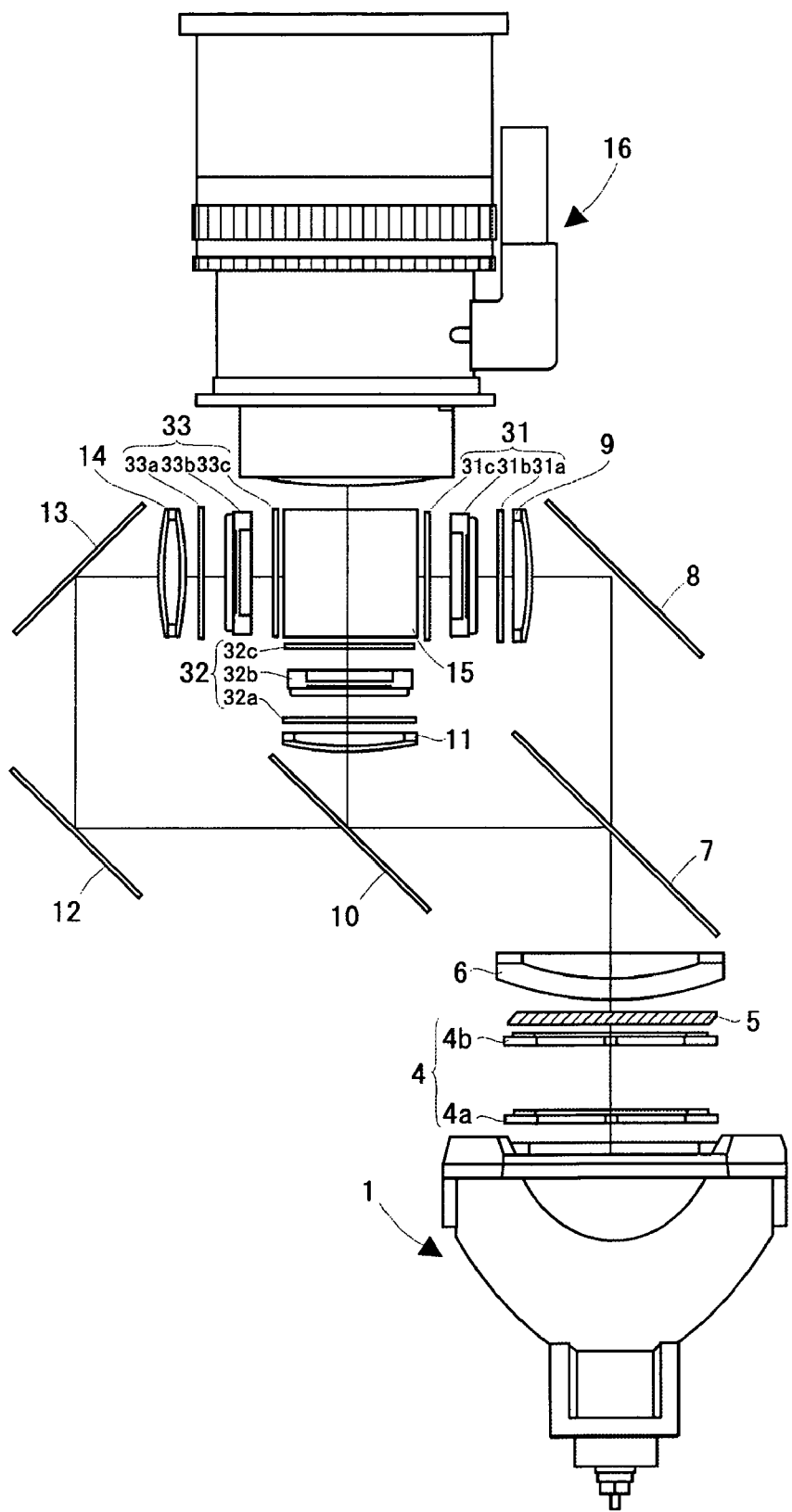
FIG. 1 is diagram showing the configuration of a liquid crystal projector according to an embodiment of the present invention.

FIG. 1 is a diagram showing a three-panel liquid crystal projector according to the present embodiment. A light emitting portion in a light source 1 is composed of a ultra-high pressure mercury lamp, a metal halide lamp, a xenon lamp, or the like, and its irradiated light is emitted after being changed into parallel lights by a parabolic reflector, and is introduced into an integrator lens 4.

The integrator lens 4 is composed of a pair of groups of lenses (fly's eye lenses) 4a and 4b, and each of lenses composing the fly's eye lens introduces light emitted from the light source 1 into the whole surface of a liquid crystal light valve, described later, to average partial non-uniformity in luminance which exists in the light source 1 and reduce the difference between light amounts at the center and the periphery of the screen. The light which has passed through the integrator lens 4 is introduced into a first dichroic mirror 7 after passing through a polarization conversion system 5 and a condenser lens 6.

The polarization conversion system 5 is composed of a polarizing beam splitter array (hereinafter referred to as a PBS array). The PBS array comprises polarized light separating surfaces and retardation plates (½ λ plates). Each of the polarized light separating surfaces in the PBS array passes P-polarized light and changes an optical path of S-polarized light by 90 degrees, for example, of lights from the integrator lens 4. The S-polarized light whose optical path has been changed is reflected on the adjacent polarized light separating surface and is emitted as it is. On the other hand, the P-polarized light which has passed through the polarized light separating surface is emitted after being converted into S-polarized light by the retardation plate provided on the front side (on the light exit side). That is, nearly all the lights are converted into S-polarized lights in this case.

The first dichroic mirror 7 transmits light in a red wavelength band and reflects light in a cyan (green+blue) wavelength band. The light in the red wavelength band which has passed through the first dichroic mirror 7 is reflected on a reflecting mirror 8 so that its optical path is changed. The red light reflected on the reflecting mirror 8 is optically modulated by passing through the transmission type liquid crystal light valve for red light 31 through a lens 9. On the other hand, the light in the cyan wavelength band which has been reflected on the first dichroic mirror 7 is introduced into a second dichroic mirror 10.

The second dichroic mirror 10 transmits light in a blue wavelength band and reflects light in a green wavelength band. The light in the green wavelength band which has been reflected on the second dichroic mirror 10 is introduced into a transmission type liquid crystal light valve for green light 32 through a lens 11, and is optically modulated by passing through the liquid crystal light valve 32. The light in the blue wavelength band which has passed through the second dichroic mirror 10 is introduced into the transmission type liquid crystal light valve for blue light 33 through a total reflection mirror 12, a total reflection mirror 13, and a lens 14, and is optically modulated by passing through the liquid crystal light valve 33.

The liquid crystal light valves 31, 32, and 33 respectively comprise incidence-side light polarizing plates 31a, 32a, and 33a, panels 31b, 32b, and 33b constructed by sealing a liquid crystal between a pair of glass boards (having a pixel electrode and an alignment film formed therein), and output side light polarizing plates 31c, 32c, and 33c.

The lights (video lights in respective colors) which have been modulated by respectively passing through the liquid crystal light valves 31, 32, and 33 are mixed by a cross dichroic prism 15, to be a color video light. The color video light is enlarged and projected by a projection lens 16, and is projected and displayed on a screen (not shown).

Figure 2:
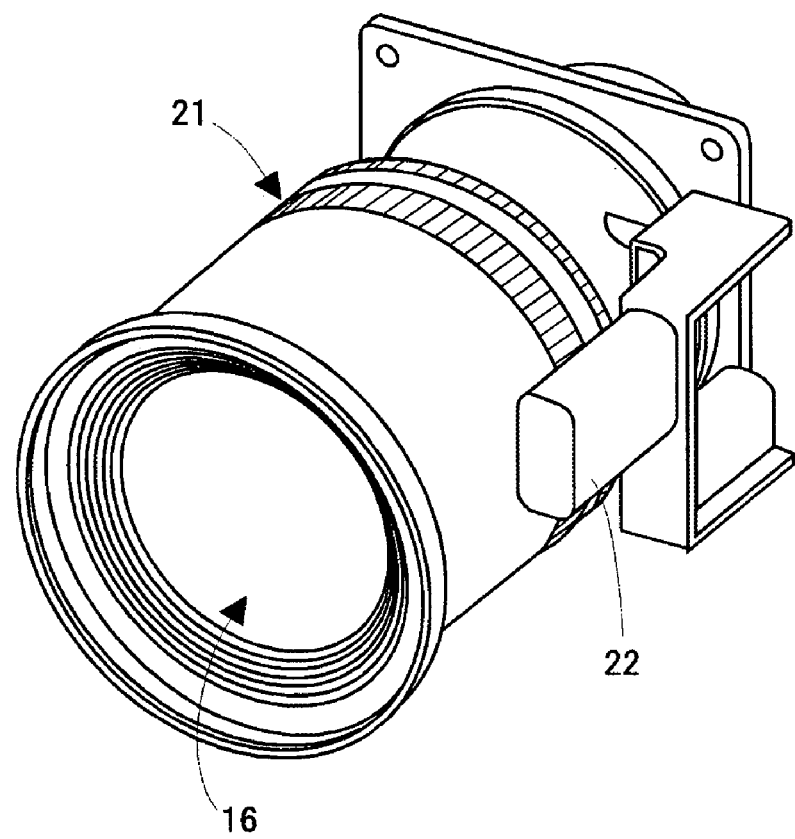
FIG. 2 is an enlarged perspective view showing a projection lens.

The projection lens 16 comprises a diaphragm mechanism 21 for stopping down projected video light and a diaphragm mechanism motor (using a stepping motor, for example) 22, as shown in FIG. 2. When a driving signal is fed to the diaphragm mechanism motor 22 from a microcomputer 25, described later, an opened/closed state of the diaphragm mechanism 21 is adjusted.

Figure 3A:
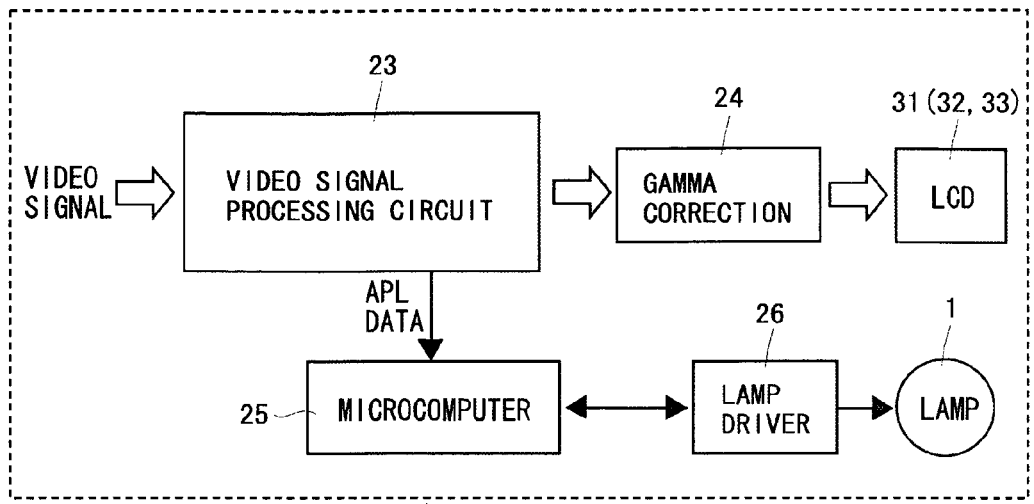
FIG. 3A is a block diagram showing a video processing system and a light source control system.
Figure 3B:
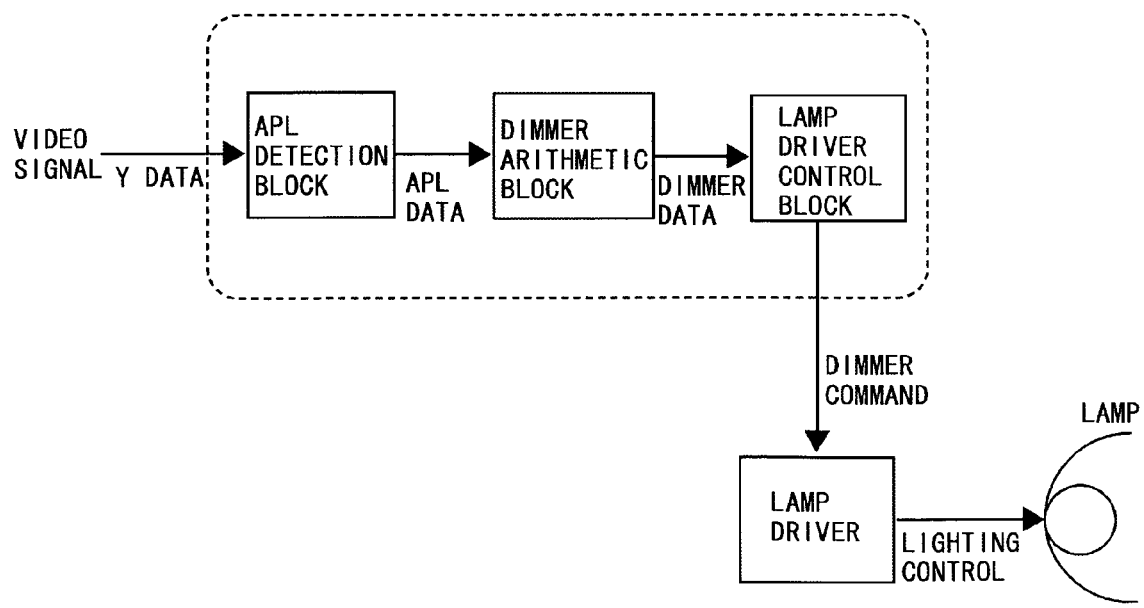
FIG. 3B is an explanatory view showing a light source control system by a functional block.

FIG. 3A is a block diagram showing a video processing system and a light source control system in a projection type video display, and FIG. 3B is an explanatory view showing the light source control system by a functional block. The video signal processing circuit 23 inputs a video signal to perform processing such as frequency conversion (conversion of the number of scanning lines) as well as processing for generating data representing the APL (Average Picture Level) (hereinafter referred to as APL data) of a frame video for each frame period on the basis of a video signal (Y signal). When an RGB signal is inputted as the video signal, the RGB signal may be subjected to matrix conversion to generate Y data. A gamma correction circuit 24 performs correction processing in view of applied voltage/optical transmission characteristics of a liquid crystal light valve (LCD), and feeds the video signal (video data) after the correction to the liquid crystal light valve (drives the liquid crystal light valve). The microcomputer 25 functions as a dimmer arithmetic block shown in FIG. 3B to performs processing for generating dimmer data upon receipt of the APL data, and functions as a lamp driver control block to perform processing for sending out a dimmer command to a lamp driver 26. The lamp driver 26 receives the dimmer command, to control an amount of light emitted from a light source (a lamp).

Figure 4A:
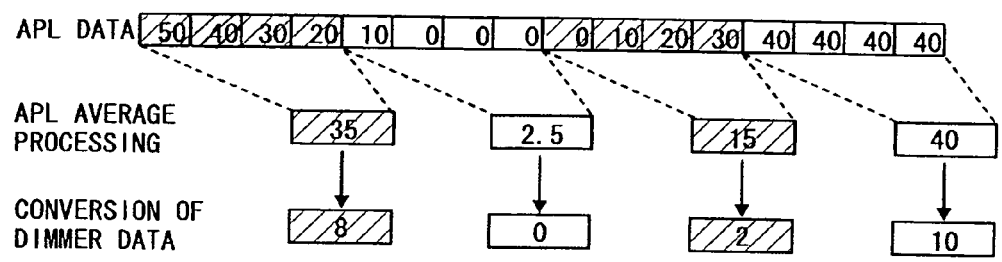
FIG. 4A is an explanatory view showing the relationship among APL data, production of an average APL value, and processing for converting dimmer data.
Figure 4B:
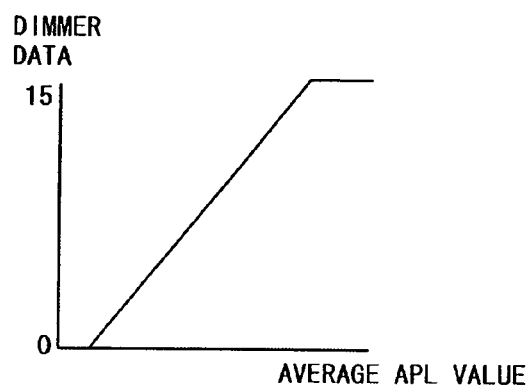
FIG. 4B is an explanatory view showing nonlinear conversion characteristics in a table for generating dimmer data on the basis of the average APL value.

FIG. 4A is an explanatory view showing the relationship among APL data, production of an average value of APL data (hereinafter referred to as average APL value), and processing for converting dimmer data, and FIG. 4B is an explanatory view showing nonlinear conversion characteristics in a table (a dimmer arithmetic block) for generating dimmer data on the basis of the average APL value. For example, the APL data (e.g., data composed of six bits) is generated for each frame period (every one vertical period), and the average APL value (6-bit data) is an average value of APL data in continuous four frame periods. When the average APL value is given as a read address to the table, dimmer data (e.g., 4-bit data: at 16 levels from Level 0 to Level 15) is outputted from the table. For example, the dimmer data is "0000" when the video is the darkest video, while being "1111" when the video is the brightest video.

A power supply in the lamp driver 26 is provided with a circuit, for example, so adapted that a plurality of resistors are connected in series so that a desired voltage can be extracted by the drop in a voltage produced at nodes among the resistors. That is, switches are respectively connected to the nodes among the resistors, thereby allowing light source driving power to be switched depending on which of the switches is turned on. The lamp driver 26 controls the switches such that light is emitted at the maximum output power level (e.g., 130 watts) when it receives "1111" as a dimmer command, while controlling the switches such that light is emitted at the minimum output power level (e.g., 105 watts) when it receives "0000" as a dimmer command, for example. Of course, not only a power changing circuit using the above-mentioned resistors and switches but also a circuit for changing power consumption by phase control, switching power supply control, and so on may be used.

Thus, a video to be projected is brightened by increasing the amount of light of the lamp when a bright video is projected, while being darkened by reducing the amount of light of the lamp when a dark video is projected, thereby improving contrast as well as restraining black floating. The power consumption is also reduced by reducing the amount of light of the lamp, thereby improving an energy saving effect. The performance of light source control based on an APL may be made selectable by a user operation.

(Diaphragm Control for Projected Video Light Based on APL)

The microcomputer 25 can carry out diaphragm control for projected video light based on an APL together with or in place of the control for the amount of light of the lamp, described above. When the diaphragm control for projected video light is carried out, the microcomputer 25 carries out driving control of the diaphragm mechanism motor 22 on the basis of an APL, to adjust an opened/closed state of the diaphragm mechanism 21. That is, control is carried out such that a video to be projected is brightened by opening the diaphragm when a bright video is projected, while being darkened by closing the diaphragm when a dark video is projected.

(Shading Control Based on APL)

Figure 5:
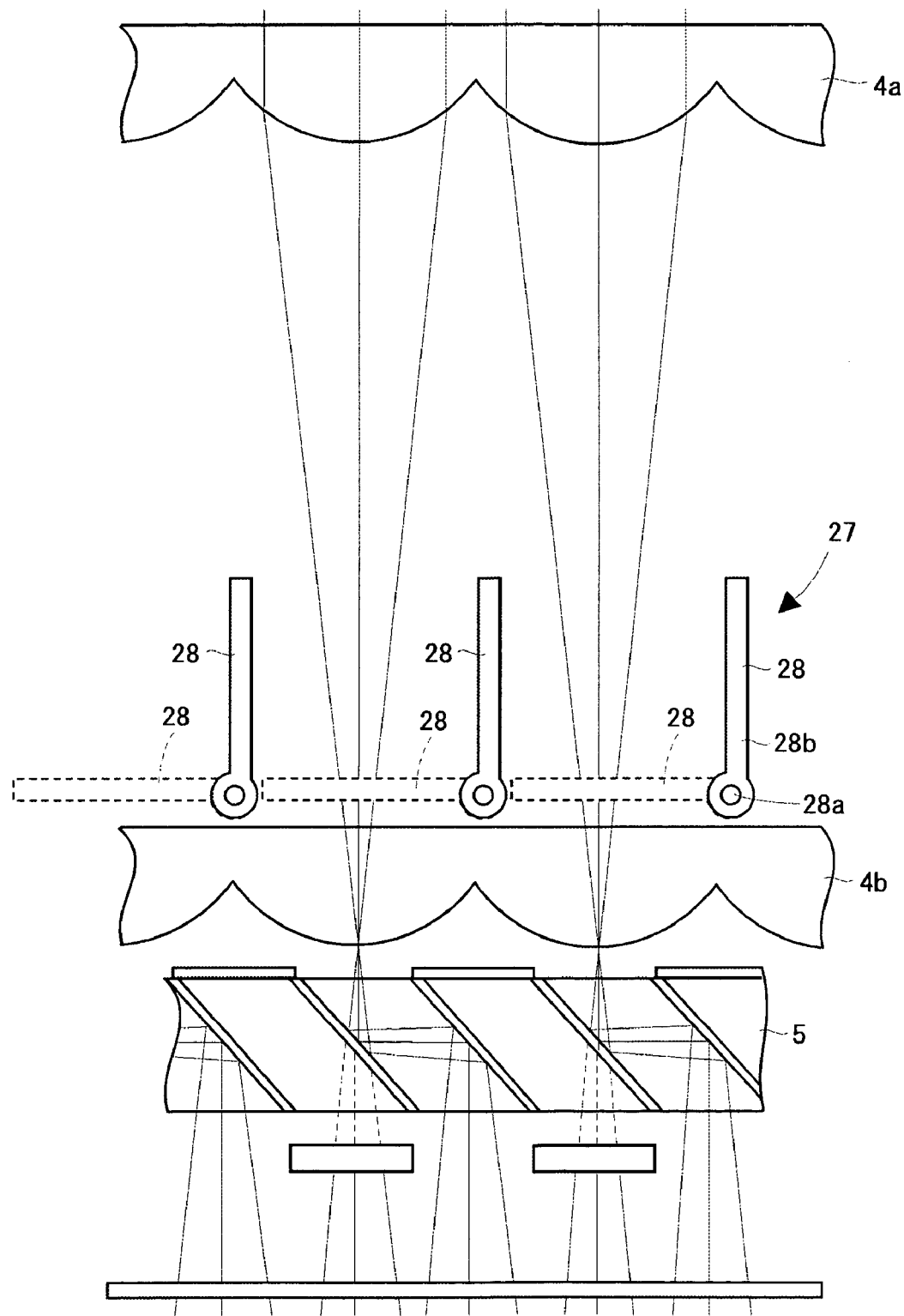
FIG. 5 is an enlarged plan view showing a portion where an optical shutter device is arranged.

It is also possible to provide a shutter device, to control an amount of shading of illuminating light on the basis of an APL. For example, the shutter device 27 comprises 15 shutters 28, and each of the shutters 28 is provided at a position in the vicinity of a group of lenses 4b positioned on the side of the polarization conversion system 5 and not preventing the passage of effective illuminating light, as shown in FIG. 5. Each of the shutters 28 comprises a shaft 28a and a shading plate 28b fastened to the shaft 28a, which are arranged in the longitudinal direction. The shaft 22a is rotated by 90 degrees, thereby allowing a shaded state and a transmitted state of illuminating light to be changed. A driving device (not shown) individually rotates the shutters 28 by a motor or an actuator such as an electromagnetic solenoid. The driving device performs a shading operation so as to form a transmitted state with respect to all the shutters 28 when it receives "1111" as a dimmer command, form a shaded state with respect to the rightmost shutter 28 when it receives "1110", form a shaded state with respect to the leftmost shutter 28 too when it receives "1101", and further form a shaded state with respect to the second shutter from the left end 28 too when it receives "1100", for example.

The diaphragm control for projected video light and the shading control based on an APL, described above, are not for reducing the amount of light of the lamp. Therefore, the power consumption cannot be reduced. However, control for brightening a video to be projected when a bright video is projected, while darkening a video to be projected when a dark video is projected is realized, thereby making it possible to improve contrast as well as to restrain black floating.

As described in the foregoing, according to the present invention, control for brightening a video to be projected when a bright video is projected, while darkening a video to be projected when a dark video is projected is realized, thereby improving contrast. When a liquid crystal light valve is used as a light valve, black floating can be restrained. Further, a configuration in which an amount of light emitted from a light source is controlled produces the effect of reducing power consumption.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A projection type video display that optically modulates light emitted from a light source by a light valve and projects a video, the projection type video display comprising:
   means for generating data representing an average picture level of a video on the basis of a video signal;
   control means for controlling an amount of light emitted from the light source based on the data representing the average picture level; and
   a lamp driver to drive the light source,
   wherein the control means includes a look-up table having a plurality of addresses respectively addressing a plurality of control data for controlling the amount of light emitted from the light source, and the data representing the average picture level is used to address the look-up table causing the look-up table to output to the lamp driver corresponding control data for controlling the amount of light output by the light source, and
   wherein the control data output by the look-up table is n-bit data representing $2^n$ levels of dimmer data used to control $2^n$ levels of brightness of the light source, and the control data is output to the lamp driver to drive the light source.

2. The projection type video display according to claim 1, wherein the control means controls power supplied to the light source.

3. A projection type video display that optically modulates light emitted from a light source by a light valve and projects a video, the projection type video display comprising:
   a diaphragm for stopping down projected video light;
   means for generating data representing an average picture level of a video on the basis of a video signal;
   control means for controlling an amount of opening of the diaphragm based on the data representing the average picture level; and
   a diaphragm motor to drive the diaphragm,
   wherein the control means includes a look-up table having a plurality of addresses respectively addressing a plurality of control data for controlling the amount of opening of the diaphragm, and the data representing the average picture level is used to address the look-up table causing the look-up table to output to the diaphragm motor corresponding control data for controlling the amount of opening of the diaphragm, and
   wherein the control data output by the look-up table is n-bit data representing $2^n$ levels of diaphragm control data, and the control data is output to the diaphragm motor to drive the diaphragm.

4. A projection type video display that optically modulates light emitted from a light source by a light valve and projects a video, the projection type video display comprising:
   a shutter unit including a plurality of shutters for adjusting shading of illuminating light from the light source;
   means for generating a signal representing the average picture level of a video on the basis of a video signal; and
   control means for controlling the shutter unit to control an amount of shading by the shutter unit in response to the signal representing the average picture level,
   wherein the control means selectively controls at least one shutter of the plurality of shutters based on the signal representing the average picture level to control the amount of shading by the shutter unit, the control means selectively controlling individual shutters of the plurality of shutters such that a number of shutters fewer than all of the shutters can be controlled to open or close to control the amount of shading by the shutter unit.

5. The projection type video display according to claim 1, wherein the means for generating the signal representing the average picture level of the video on the basis of the video signal produces an average value of average picture levels in a plurality of continuous frames.

6. The projection type video display according to claim 2, wherein the means for generating the signal representing the average picture level of the video on the basis of the video signal produces an average value of average picture levels in a plurality of continuous frames.

7. The projection type video display according to claim 3, wherein the means for generating the signal representing the average picture level of the video on the basis of the video signal produces an average value of average picture levels in a plurality of continuous frames.

8. The projection type video display according to claim 4, wherein the means for generating the signal representing the average picture level of the video on the basis of the video signal produces an average value of average picture levels in a plurality of continuous frames.

* * * * *